May 16, 1939.  J. P. EASTMAN  2,158,619
COUPLING CONSTRUCTION
Filed May 21, 1937  2 Sheets-Sheet 1
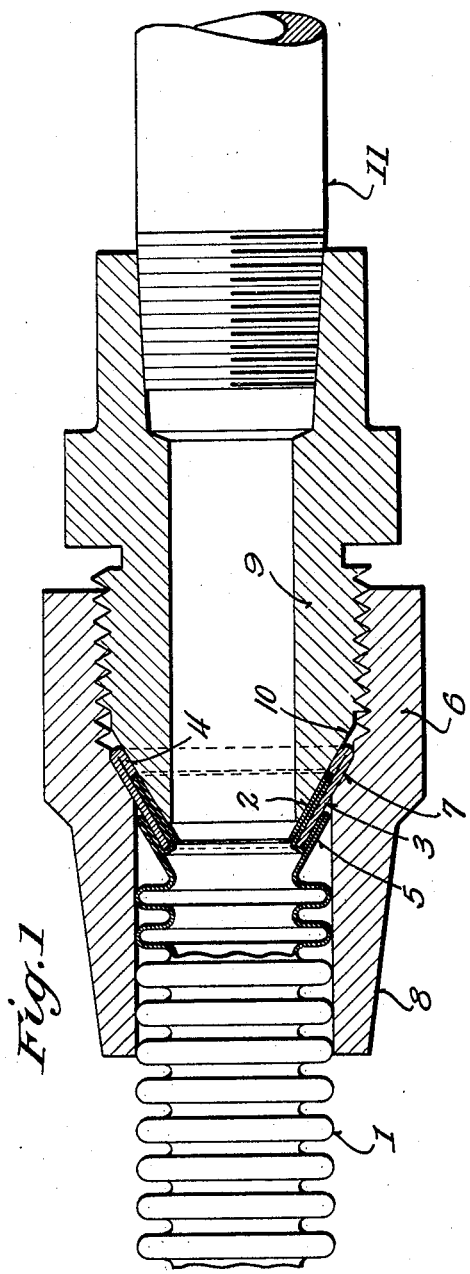
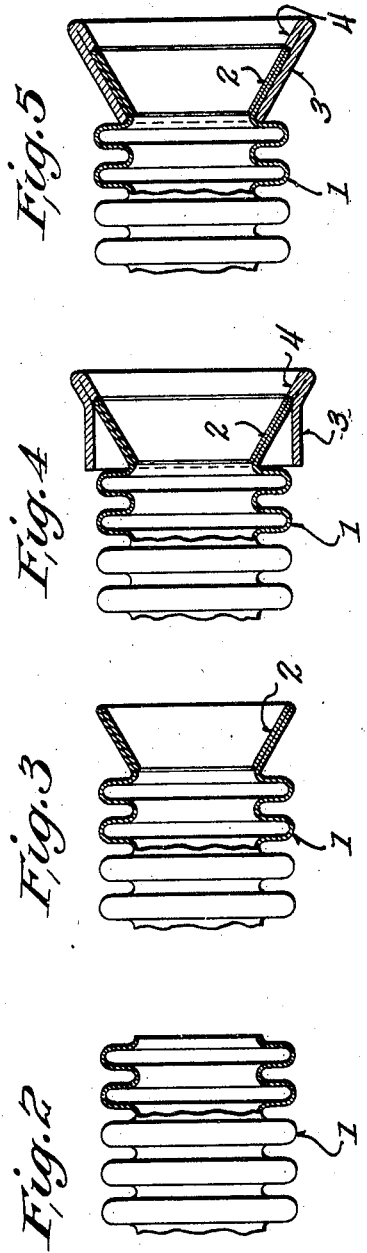
INVENTOR.
JOSEPH PETER EASTMAN
BY
ATTORNEY.

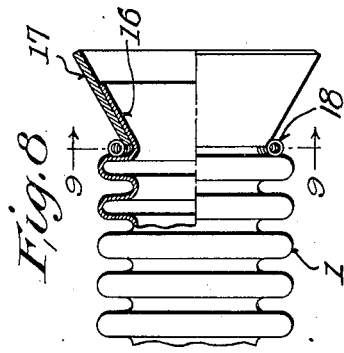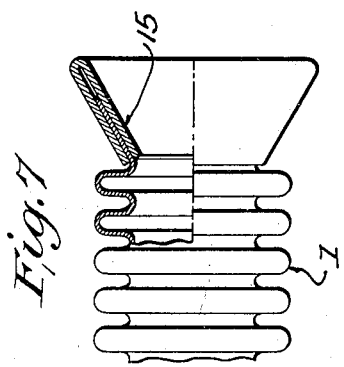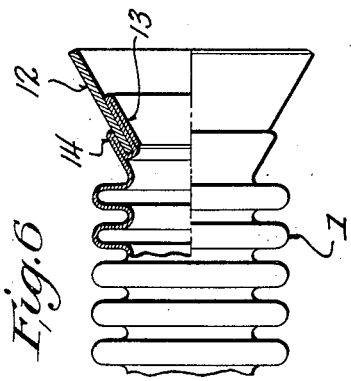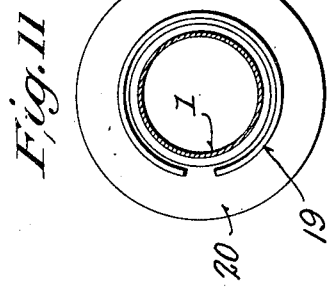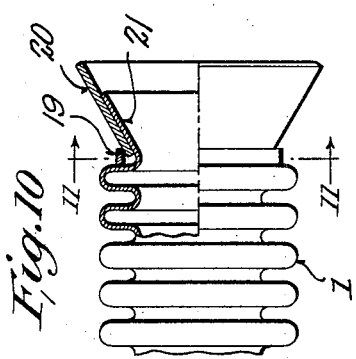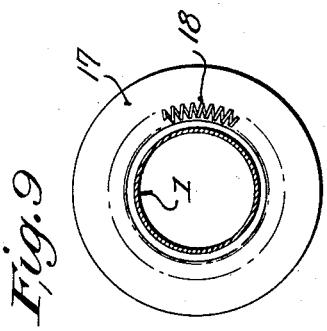

Patented May 16, 1939

2,158,619

UNITED STATES PATENT OFFICE 2,158,619

COUPLING CONSTRUCTION

Joseph Peter Eastman, Manitowoc, Wis.

Application May 21, 1937, Serial No. 143,874

4 Claims. (Cl. 285—86)

This invention relates to couplings and is particularly directed to a coupling construction for seamless metal tubing and to the method of making it.

Seamless metal tubing is frequently provided for relatively low pressures, though the invention is not to be limited to any specific pressure, and it is customary to form this seamless metal tubing with relatively thin walls which have a series of bellows-like folds projecting inwardly and outwardly, to thereby provide great flexibility for this seamless metal tubing. However, difficulty has been encountered when it is attempted to attach a coupling member to the end of the seamless metal hose so that the hose may be attached to or detached from any other cooperating coupling member.

Objects of this invention are to provide a coupling construction for seamless flexible metal tubing which will not crush or damage the tubing, which provides an accurate gas-tight and liquid-tight seat, which is readily detachable, and which reenforces the tubing adjacent the seat, and which is so constructed that bending of the flexible tubing immediately adjacent the seat with consequent deformation of the seat is prevented.

Further objects are to provide a coupling construction which though primarily applicable to seamless flexible metal tubing, nevertheless may be applied to other types of metal tubing, particularly those that have thin, easily damaged walls, and which is so constructed that a reenforcing member or reenforcing means is provided for reenforcing the seat which is formed on the metal tubing, the reenforcing member forming supporting means for the reenforced seat so that the seat is supported from one of the coupling members and the coupling member is thereby allowed to slip freely over the tubing to not only correctly position the seat but also to protect the immediately adjacent portion of the tubing from distortion, so that an accurate seat is maintained, the construction including a readily detachable cooperating coupling member which may be screwed into place and which will accurately conform to the reenforced seat.

Further objects are to provide a coupling construction for seamless flexible metal tubing which is so made that a simple construction of coupling may be employed and in which an easily produced and reliable type of seat is provided and formed on the flexible metal tubing itself, the coupling member being freely mounted so that it may swivel on the flexible metal tubing.

A further object is to provide a method of forming a seat on the end of flexible metal tubing of bellows-like formation having a series of inward and outwardly directed folds.

In greater detail, a further object of this invention is to provide a method of forming a seat on the end of the flexible metal tubing of bellows-like formation having a series of inward and outwardly directed folds by a spinning operation, my copending application for Couplings, Serial No. 143,899, filed May 21, 1937, disclosing a method of making the coupling by a die process.

Embodiments of the invention are shown in the accompanying drawings, in which:

Figure 1 is a sectional view through one form of the coupling.

Figures 2, 3, 4 and 5 disclose successive steps in the process of forming the coupling shown in Figure 1.

Figure 6 shows a further form of construction.

Figure 7 shows a still further form of the invention.

Figure 8 shows a further form of the invention in which the reenforcing ring is held in place by an annular helical spring.

Figure 9 is a sectional view on the line 9—9 of Figure 8.

Figure 10 is a view corresponding to Figure 8 showing the manner in which the reenforcing ring is held in place by a split spring.

Figure 11 is a sectional view on the line 11—11 of Figure 10.

Referring to Figure 1, which shows one form of the invention, and to Figures 2, 3, 4 and 5, which show steps in the process of forming the device, it will be seen that the flexible metal tubing 1 is of bellows-like construction having a series of inwardly and outwardly directed folds. In practicing the invention the outermost fold is flattened, as indicated at 2, to provide a seat which may be conical as shown. Obviously a single thickness of the metal tubing may be utilized if desired, though it is preferable to have the additional strength of two thicknesses, as shown in Figures 1, 3, 4 and 5. This seat may be spun or pressed into a conical shape, as shown in Figure 3. Thereafter an annular, preferably unbroken reenforcing ring is provided and is indicated by the reference character 3 in Figure 4. This annular reenforcing ring is preferably formed of metal of twice the thickness of that of the flexible metal tubing and has an inturned outer portion 4. It may be spun or pressed into the shape shown in Figure 4, but thereafter the lower portion or inner portion of the ring is spun inwardly, as shown in Figure 5, so that it is locked to the seat portion 2 of the flexible metal tube. This locking is secured, as is obvious from Figure 5, for the reason that the conical shape of the surrounding reenforcing ring 3 prevents its outward withdrawal and it cannot be pressed inwardly on account of the fact that the inwardly turned portion 4 thereof abuts the outer end of the seat portion 2 of the flexible metal tubing. If desired, the inner or bottom end of the reenforcing ring 3 may abut the next fold, as shown in Figure 5.

The next step in the process of forming this coupling is to take the next adjacent fold and spin it outwardly against the lower outer side of the reenforcing ring 3 so as to flatten the fold and provide the flattened locking portion 5, see Figure 1, which locks against the outer side of the reenforcing ring 3, the seat portion 2 locking against the inner side of the reenforcing ring 3.

By inturning the portion 4 of the ring, it is apparent that a smooth surface is provided throughout the entire seating zone of the ring, though it is within the province of this invention to omit the inwardly turned portion 5 if so desired, as will appear hereinafter.

The flexible metal tube has its end surrounded and received by the tubular coupling member 6 which is provided with an annular internally located shoulder 7 upon which the ring 3 rests to thereby support the seat 2. The coupling 6 continues rearwardly to provide a sleeve 8 loosely surrounding the flexible metal tubing 1 and extending over a plurality of successive folds thereof so that bending or flexing of the metal tubing will not distort the seat.

The other coupling member is indicated at 9 and may screw into the coupling member 6 and is provided with a bevelled end 10 which seats within the conical seat 2 and forms a gas and liquid-tight joint therewith. The coupling member 9 may be rigidly screwed upon a pipe or other member 11, as desired. It is obvious that the members 6 and 9 may have polygonal surfaces in accordance with the usual practice so that a wrench may be used in tightening them up.

The tubular coupling member 6 freely swivels on the flexible tubular member 1 and it is thus very easy to couple or uncouple the flexible metal tubing. If desired, a split ring, not shown, may be placed rearwardly of the sleeve portion 8 of the coupling member 6 and may be carried between successive folds of the flexible metal tubing, though this construction is not essential to the operation of the device and may be omitted if desired, as has been done in Figure 1.

In the form of the invention shown in Figure 6, the reenforcing ring 12 is locked between the seat portion 13 formed of a flattened fold and the back or rear locking member 14 formed of a flattened folded portion of the flexible metal tubing 1. The device shown in Figure 6 may be produced by following identically the same method as that described in connection with Figures 3, 4 and 5.

In Figure 7 the end of the flexible metal tubing is not doubled but is flattened and flared into a conical shape. It is received between the two layers of the reenforcing ring 15 which is spun in place. The reenforcing ring 15 in this form of the invention forms the actual seat. In Figure 7 it is apparent that the inner portion of the reenforcing ring 15 may be initially conically shaped, if desired, and slipped into place, or else may be spun into place, but the outer portion of the ring 15 is preferably spun into place.

In the form of the invention shown in Figure 8, the flexible metal tubing has the flared or conical seat portion 16 received within the conical reenforcing ring 17 which is spun into place. If desired an annular helical spring 18 may be employed to lock the reenforcing ring 17 against displacement from the seat portion 16, as clearly shown in Figures 8 and 9, the annular spring 18 bearing against the ring 17 and the next adjacent annular fold of the flexible metal tubing 1.

Substantially the same construction is illustrated in Figures 10 and 11, but in this form of the invention a split ring in the form of a flat or rectangular spring 19 is employed to hold the reenforcing conical ring 20 against the outer face of the conical seat 21 of the flexible metal tubing.

It is to be noted that the reenforcing ring not only reenforces the seat portion of the coupling but also extends beyond the periphery of the flexible metal tubing and rests upon the annular supporting shoulder of the tubular coupling member and thus supports the seat portion from the internal shoulder of the tubular coupling member.

Although the seat portion has been shown as conical, it is to be understood that it is within the province of this invention to form the seat portion flat as well as conical, or if it is found desirable, it is obviously also within the province of this invention to form the seat portion spherical.

It is apparent that there is no danger of tearing the flexible metal tubing during the operation of coupling or uncoupling it. Instead the tubular coupling member merely freely swivels on the flexible metal tubing and presses the seat portion formed on such tubing tightly and securely against the corresponding seat portion formed on the cooperating coupling member.

Also, as will be noted from Figure 1, the reenforcing ring for the seat portion not only reenforces the seat portion but also forms a supporting member so that the seat portion is supported from the internally arranged annular shoulder of the tubular coupling member.

It will be seen also that the process of forming the coupling construction is very simple and may be rapidly performed and is an inexpensive process to follow.

Although this invention has been described in considerable detail, it is to be understood that such description is intended as illustrative rather than limiting, as the invention may be variously embodied and is to be interpreted as claimed.

I claim:

1. A coupling construction for a flexible metal hose having bellows-like inwardly and outwardly directed folds, said coupling construction comprising a tubular coupling member surrounding the end of said hose, said hose having an outwardly flared end forming a seat portion, an annular reenforcing member conforming to the outer surface of said seat portion, spring means for preventing shifting of said annular reenforcing member with reference to said hose, and a second coupling member screw-connected with said tubular coupling member and having an end seating upon the seat portion of said flexible metal hose.

2. A coupling construction for a flexible metal hose having bellows-like inwardly and outwardly directed folds, each fold forming a continuous closed ring about the hose, said coupling construction comprising a tubular coupling member surrounding the end of said hose, said hose having an outwardly flared end forming a seat portion, a rigid annular reinforcing member located behind said seat portion and conforming to the outer surface of said seat portion, spring means for holding said rigid annular reinforcing member in contact with the outer surface of said seat portion, and a second coupling member screw threaded into said tubular coupling member and having an end seating upon the seat portion of said flexible metal hose, said tubular coupling member having an annular internal shoulder and said rigid annular reinforcing member extending outwardly beyond the outline of said hose and being supported directly from said annular shoulder.

3. A coupling construction for a flexible metal hose having bellows-like inwardly and outwardly directed folds, each fold forming a continuous closed ring about the hose, said coupling construction comprising a tubular coupling member surrounding the end of said hose, said hose having an outwardly flared end forming a seat portion, a rigid annular reinforcing member located behind said seat portion and conforming to the outer surface of said seat portion, means for holding said rigid annular reinforcing member in contact with the outer surface of said seat portion, and a second coupling member screw threaded into said tubular coupling member and having an end seating upon the seat portion of said flexible metal hose, said tubular coupling member having an annular internal shoulder and said rigid annular reinforcing member extending outwardly beyond the outline of said hose and being supported directly from said annular shoulder.

4. A coupling construction for a flexible metal hose having bellows-like inwardly and outwardly directed folds, each fold forming a continuous closed ring about the hose, said coupling construction comprising a tubular coupling member surrounding the end of said hose, said hose having an outwardly flared end forming a seat portion, a rigid conical reinforcing member located behind said seat portion and conforming to the outer surface of said seat portion, means for holding said rigid conical reinforcing member in contact with the outer surface of said seat portion, and a second coupling member screw threaded into said tubular coupling member and having an end seating upon the seat portion of said flexible metal hose, said tubular coupling member having an annular internal shoulder and said rigid conical reinforcing member extending outwardly beyond the outline of said hose and being supported directly from said annular shoulder.

JOSEPH PETER EASTMAN.